(12) United States Patent
Gu et al.

(10) Patent No.: US 11,114,726 B2
(45) Date of Patent: Sep. 7, 2021

(54) BATTERY BOX

(71) Applicant: Contemporary Amperex Technology Co., Limited, Fujian (CN)

(72) Inventors: Yanlong Gu, Ningde (CN); Liwen Jiang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/973,609

(22) PCT Filed: Mar. 26, 2019

(86) PCT No.: PCT/CN2019/079674
§ 371 (c)(1),
(2) Date: Dec. 9, 2020

(87) PCT Pub. No.: WO2020/133760
PCT Pub. Date: Jul. 2, 2020

(65) Prior Publication Data
US 2021/0167458 A1    Jun. 3, 2021

(30) Foreign Application Priority Data

Dec. 27, 2018 (CN) .......................... 201822224422.3

(51) Int. Cl.
*H01M 50/244* (2021.01)
*H01M 10/613* (2014.01)
(Continued)

(52) U.S. Cl.
CPC ....... *H01M 50/244* (2021.01); *H01M 10/613* (2015.04); *H01M 10/625* (2015.04);
(Continued)

(58) Field of Classification Search
CPC ............ H01M 10/613; H01M 10/625; H01M 10/6556; H01M 50/209; H01M 50/244;
(Continued)

(56) References Cited

U.S. PATENT DOCUMENTS

| | | | | |
|---|---|---|---|---|
| 2012/0321927 | A1* | 12/2012 | Loo .......................... | B60K 1/04 |
| | | | | 429/100 |
| 2014/0315064 | A1* | 10/2014 | Katayama ............... | B60L 58/27 |
| | | | | 429/120 |
| 2019/0386358 | A1* | 12/2019 | Chen ....................... | B60L 50/64 |

FOREIGN PATENT DOCUMENTS

| | | |
|---|---|---|
| CN | 206841148 U | 1/2018 |
| CN | 207199691 U | 4/2018 |

(Continued)

OTHER PUBLICATIONS

Search Report dated Jul. 19, 2019 in corresponding International Application No. PCT/CN2019/079674; 5 pages.

(Continued)

*Primary Examiner* — Gregg Cantelmo
(74) *Attorney, Agent, or Firm* — Maier & Maier, PLLC (57) ABSTRACT

A battery box including a lower box body, where the lower box body includes a first plate and a second plate. The first plate includes: a bottom wall; a peripheral wall connected to a periphery of the bottom wall and extending upward; and the bottom wall and the peripheral wall form an accommodating space opening upwards; the second plate is fixed to the bottom wall from a bottom and engages with the bottom wall to form a flow passage. The second plate is provided with: a second protrusion protruding to the first plate from a side facing away from the first plate and extending along a transverse direction; and an opening running through the second protrusion in a height direction and extending along (Continued)

the transverse direction, the second protrusion of the second plate being connected to the bottom wall of the first plate in a sealed manner.

10 Claims, 6 Drawing Sheets

(51) Int. Cl.
*H01M 10/625* (2014.01)
*H01M 10/6556* (2014.01)
*H01M 50/249* (2021.01)
*H01M 50/209* (2021.01)
*H01M 50/264* (2021.01)

(52) U.S. Cl.
CPC ..... *H01M 10/6556* (2015.04); *H01M 50/209* (2021.01); *H01M 50/249* (2021.01); *H01M 50/264* (2021.01); *H01M 2220/20* (2013.01)

(58) Field of Classification Search
CPC . H01M 50/249; H01M 10/6554; B60L 50/50; B60L 50/64
See application file for complete search history.

(56) References Cited

FOREIGN PATENT DOCUMENTS

| | | |
|---|---|---|
| CN | 108565524 A | 9/2018 |
| WO | 2011/134828 A1 | 11/2011 |

OTHER PUBLICATIONS

Written Opinion dated Jul. 19, 2019 in corresponding International Application No. PCT/CN2019/079674; 6 pages.

\* cited by examiner

BATTERY BOX

CROSS-REFERENCE TO RELATED APPLICATIONS

This application is a national stage of International Application No. PCT/CN2019/079674, filed on Mar. 26, 2019, which claims priority to Chinese Patent Application No. 201822224422.3, filed on Dec. 27, 2018. Both of the aforementioned applications are hereby incorporated by reference in their entireties.

TECHNICAL FIELD

The present disclosure relates to the field of battery, in particular to a battery box.

BACKGROUND

With the development of power battery technology, requirements of a power battery for an electric vehicle are higher and higher, correspondingly, requirements for power battery heat exchange system are also higher and higher, and design form of integration of a lower box body and a heat exchange system has been widely concerned. Design of integration of the lower box body and the heat exchange system can reduce overall mass of a battery box and reduce cost while this design avoids influence of leakage on an inside of the battery box. In addition, the lower box body adopts a lower plate opening, which can reduce overall mass of the lower box body. However, overall strength of the box body is weak, and structural strength at an opening position is lower, thus it is easy to occur the damage during assembly or handling of the battery box.

SUMMARY

In view of problems existing in the background, a purpose of the present disclosure is to provide a battery box, which can improve overall strength of a lower box body and avoid risk of easy damage of the lower box body at a position with weak structural strength.

In order to achieve the above purpose, the present disclosure provides a battery box which includes a lower box body, where the lower box body includes a first plate and a second plate. The first plate includes: a bottom wall; a peripheral wall connected to a periphery of the bottom wall and extending upward; and the bottom wall and the peripheral wall form an accommodating space opening upwards. The second plate is fixed to the bottom wall from a bottom and engages with the bottom wall to form a flow passage; the second plate is provided with a second protrusion protruding to the first plate from a side facing away from the first plate and extending along a transverse direction; and an opening running through the second protrusion in a height direction and extending along the transverse direction, the second protrusion of the second plate being connected to the bottom wall of the first plate in a sealed manner. The battery box also includes: a reinforcing beam provided under the second plate and extending along the transverse direction; the reinforcing beam is mounted at a position corresponding to the opening and is fixedly connected to the first plate and/or the second plate.

In an embodiment, a bottom wall of a first plate is provided with: a first protrusion which is concave downward from a side of the bottom wall facing away from a second plate and protrudes to the second plate, and the first protrusion passes through an opening so as to fix a reinforcing beam on the first protrusion passing through the opening.

In an embodiment, the reinforcing beam includes a first plate body, and the first plate body includes: a bottom extending along the transverse direction; and two connecting portions integrally connected to both sides of a longitudinal direction of the bottom. Each connecting portion extends upward along the height direction and extends outward along the longitudinal direction from a corresponding side of the bottom, and the two connecting portions are close to and fixed on the first protrusion of the first plate.

In an embodiment, a second plate is provided with a first concave portion for forming a flow passage, the first concave portion is concave downward from a side of the second plate facing the first plate and protruding to the other side, and the first concave portion protrudes beyond the first protrusion; the connecting portions of the first plate body are provided with a sinking table at a position corresponding to the first concave portion of the second plate, and the sinking table is concave downward from a side of the connecting portion facing the second plate.

In an embodiment, the reinforcing beam also includes: two second plate bodies, which are fixed at two ends of the transverse direction of the first plate body and are located on an outer side of the first plate and the second plate along the transverse direction; each second plate body includes: a top wall, which is provided with a through hole running through along a high direction; two side walls, which are connected to both sides of the longitudinal direction of the top wall and extend to the first plate body; and two connecting walls, which are connected to corresponding side walls and bend outward along the longitudinal direction, respectively. Each connecting wall is attached to and fixed on a corresponding connecting portion of the first plate body.

In an embodiment, the bottom of the first plate body and the two connecting portions form a first concave groove that is concave downward; the top wall and the both side walls of the second plate body form a second groove that is concave upward, and the second groove and the first groove form a storage cavity together along a high direction.

In an embodiment, each second plate body also includes: two lugs, each lug is connected to an inner side of the transverse direction of corresponding side wall and bends outward along a plane intersecting with the transverse direction, and each lug is close to the peripheral wall of the first plate.

In an embodiment, the reinforcing beam is provided to be multiple, and each reinforcing beam is fixed on a corresponding first protrusion of the first plate, the corresponding first protrusion passing through the opening.

In an embodiment, the battery box also includes: a carling, which extends along the longitudinal direction; and a fastener, which is fixed on the longitudinal beam passing through the connecting portion of the reinforcing beam and the first protrusion of the first plate.

In an embodiment, the battery box also includes: a plurality of battery packs, which are accommodated in the accommodating space.

Beneficial effects of the present disclosure are as follows: in a battery box according to the present disclosure, the reinforcing beam is provided at an opening position of a lower box body, which increases strength of a second plate at the opening position, and avoids risk of easy damage of the lower box body at a position where structural strength is weak.

DESCRIPTION OF EMBODIMENTS

Embodiments of the present disclosure are shown in the drawings, and it will be understood that disclosed embodiments are only examples of the present disclosure, and the present disclosure may be implemented in various forms. Therefore, specific details disclosed herein should not be interpreted as limitation, but only as basis of the claims and as basis of representativeness for instructing those skilled in the art to implement the present disclosure in various manners.

In addition, expressions of indicating directions such as longitudinal, height and transverse directions, etc., used to illustrate operations and constructions of components of a battery box in the present embodiment are not absolute but relative, and although the indications are appropriate when the components of the battery box are in positions shown in the drawings, these directions should have a different interpretation to correspond to the changes when these positions are changed.

As shown in FIG. 1 to FIG. 4, a battery box 1 according to the present disclosure includes: a lower box body 1; and a reinforcing beam 2, which is fixed under the lower box body 1. The battery box body 1 also includes: a transom 3 and a carling 4, which are provided in the lower box body 1, and the reinforcing beam 2 may be fixed on the carling 4 through a fastener 5; and a plurality of battery packs 6, which are accompanied in the lower box body 1 and separated by the transom 3 and the carling 4.

Figure 5:
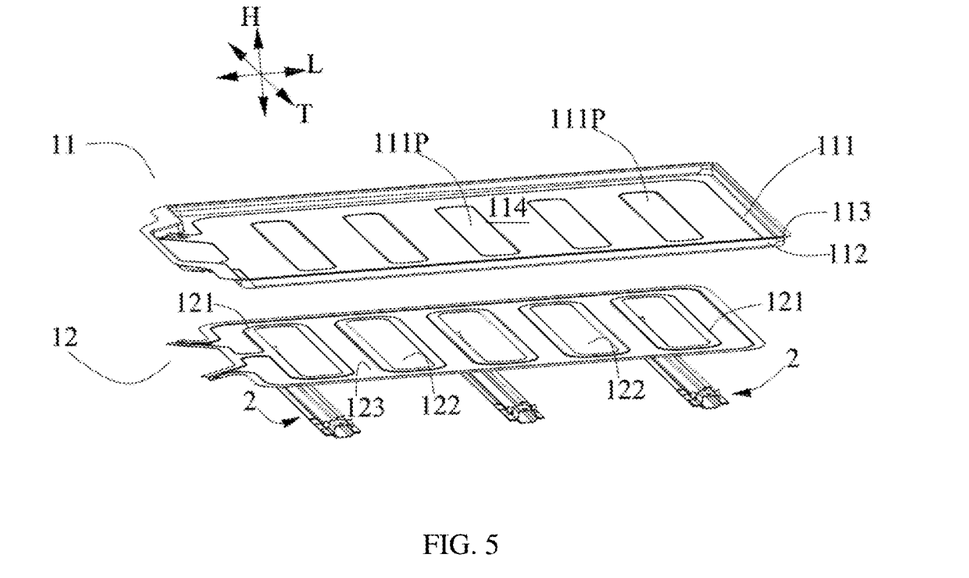
FIG. 5 is an exploded view of FIG. 2.

As shown in FIG. 5, the lower box body 1 includes: a first plate 11 and a second plate 12, the second plate 12 being fixed under the first plate 11.

The first plate 11 includes: a bottom wall 111; a peripheral wall 112, which is connected to a periphery of the bottom wall 111 and extends upward; and the bottom wall 111 and the peripheral wall 112 form an accommodating space 114 opening upwards. The first plate 11 also includes: a flange 113, which is connected to an end of the peripheral wall 112 and extends to the outside of the peripheral wall 112, where the bottom wall 111, the peripheral wall 112, and the flange 113 are formed by an integral impact. The bottom wall 111 of the first plate 11 may be provided with: a first protrusion 111P, which is concave downward from a side of the bottom wall 111 facing away from the second plate 12 and protrudes toward the second plate 12. Certainly, the bottom wall 111 of the first plate 11 may not be provided with a first protrusion 111P, which may be designed according to specific condition. The second plate 12 is fixed to the bottom wall 111 from a bottom and engages with the bottom wall 111 to form a flow passage F.

The second plate 12 is provided with: a second protrusion 121, which protrudes from a side facing the reinforcing beam 2 to the first plate 11 and extends along a transverse direction T; and an opening 122, which runs through the second protrusion 121 of the second plate 12 along the height direction H and extends along the transverse direction T, the second protrusion 121 of the second plate 12 being connected to the bottom wall 111 of the first plate 11 in a sealed manner. The second protrusion 121 is multiple, and correspondingly, the opening 122 is also multiple. Number of the first protrusion 111P corresponds to number of openings 122. Design of the opening 122 reduces weight of the second plate 12 and overall weight of the lower box body 1, thus improving energy density of the battery box. In addition, since the second plate 12 is provided with a main structure for forming a heat exchange flow passage F, it is not suitable to fix the reinforcing beam 2 on the second plate 12, and the design of the opening 122 provides a connecting space for connection between the reinforcing beam 2 and the first plate 11, so as to facilitate connection and installation of the reinforcing beam 2. The first protrusion 111P passes through the opening 122 so that the reinforcing beam 2 is fixed on the first protrusion 111P passing through the opening 122. The second plate 12 is provided with a first concave portion 123 for forming the flow passage F. The first concave portion 123 is concave downward from one side of the second plate 12 facing the first plate 11 and protrudes to the other side. The first concave portion 123 protrudes beyond the first protrusion 111P. The first concave portion 123 may also be in a same horizontal plane as the first protrusion 111P. The first protrusion 111P is inserted into the opening 122, so as to position the first plate 11 and the second plate 12 to ensure accuracy of positions of the both in an engaging process; in addition, the first protrusion 111P may also increase strength at the opening 122 of the second plate 12. Periphery of each first protrusion 111P is connected to an inner edge of the opening 122 in a sealed manner, preferably connected by welding.

Figure 1:
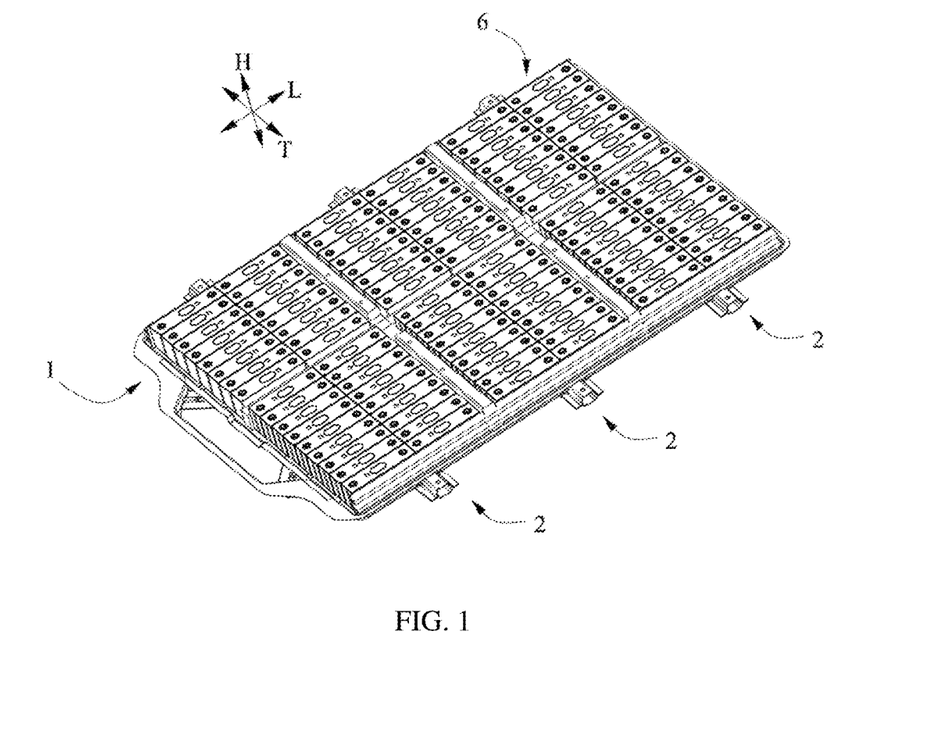
FIG. 1 is an assembly diagram of some composing components of a battery box according to the present disclosure.
Figure 2:
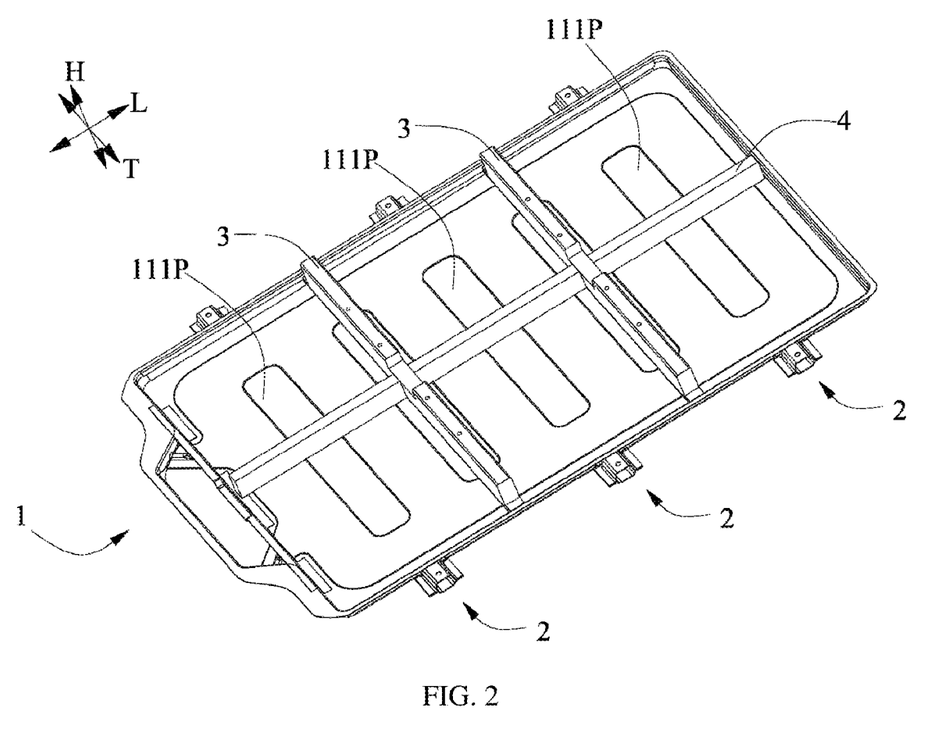
FIG. 2 is an assembly diagram of some composing components in FIG. 1.
Figure 3:
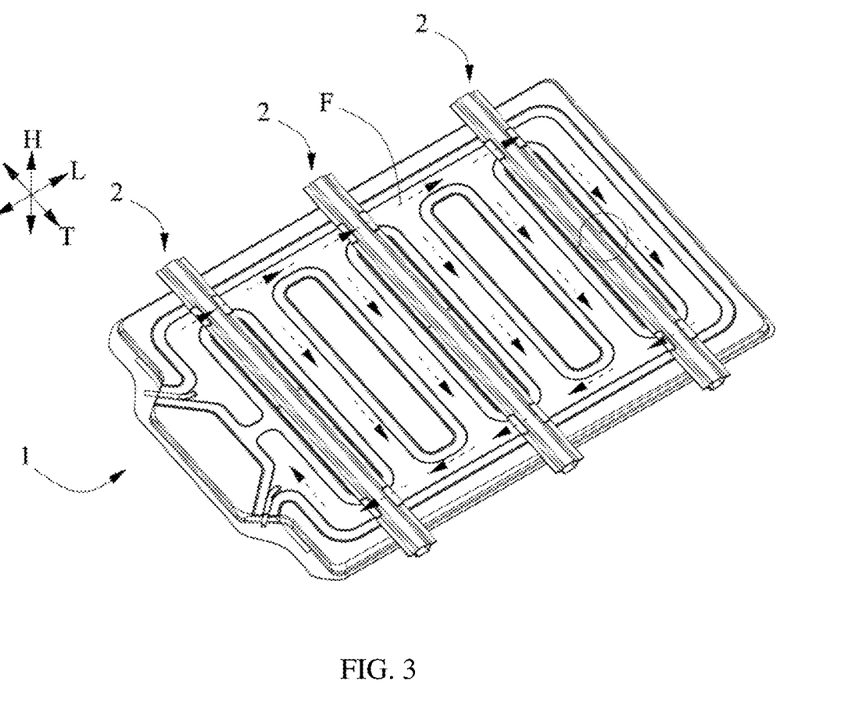
FIG. 3 is a bottom stereogram of FIG. 2.
Figure 4:
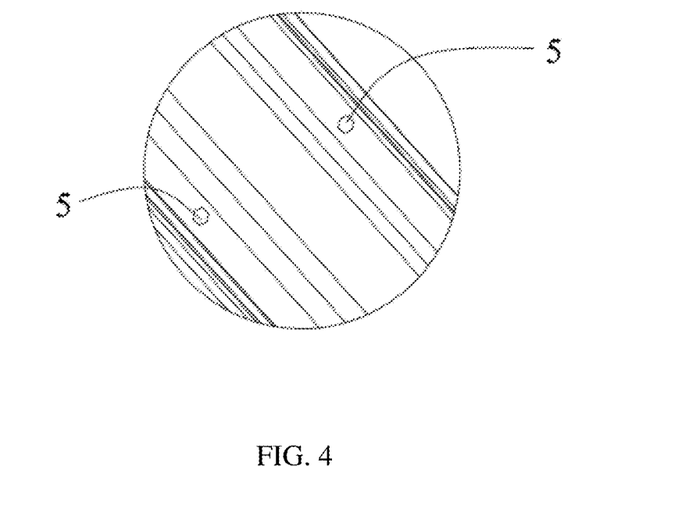
FIG. 4 is an enlargement view of a circle portion in FIG. 3.
Figure 6:
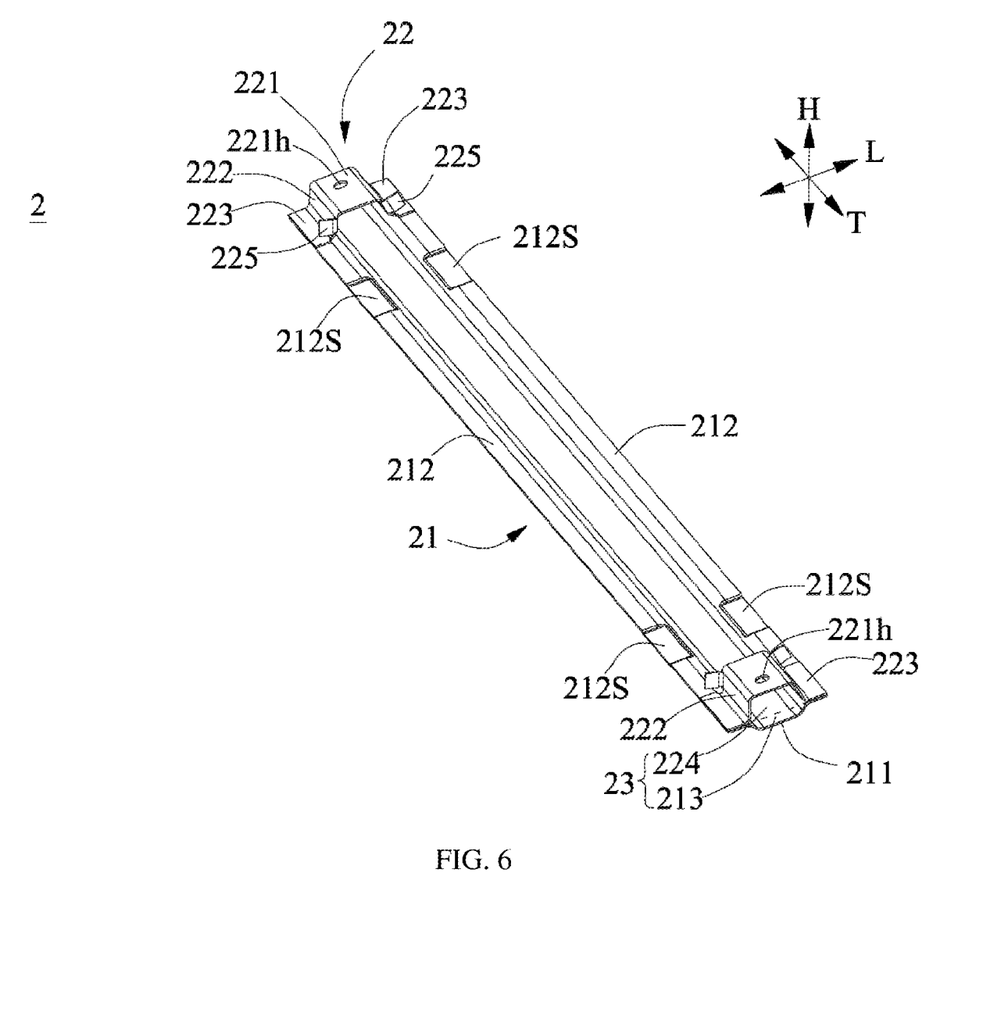
FIG. 6 is a stereogram of a reinforcing beam.

Referring to FIG. 6 and combining with FIG. 2, the reinforcing beam 2 includes a first plate body 21 and two second plate bodies 22. The two second plates bodies 22 are fixed at both ends in a transverse direction T of the first plate body 21 and are located outside the first plate 11 and the second plate 12 along the transverse direction T. The first plate body 21 and the second plate bodies 22 form a storage cavity 23 at both ends in the transverse direction T. The second plate bodies 22 are used as a hoisting portion while hoisting the battery box.

The first plate body 21 includes: a bottom 211, which extends along the transverse direction T; and two connecting portions 212, which are integrally connected to both sides in a longitudinal direction L of the bottom 211, each connecting portion 212 extending upward along the height direction H and extending outward along the longitudinal direction L from a corresponding side of the bottom 211, and the two connecting portions 212 are close to and fixed on the first protrusion 111P of the first plate 11. It should be noted that when the first plate 11 is not provided with the first protrusion 111P, the connecting portions 212 may be directly fixed on the bottom wall 111 of the first plate 11. The bottom 211 of the first plate body 21 and the two connecting portions 212 form a first concave groove 213 that is concave downward. As described above, when the first concave portion 123 protrudes beyond the first protrusion 111P, the connecting portions 212 of the first plate body 21 may be correspondingly provided with a sinking table 212S at a position corresponding to the first concave portion 123 of the second plate 12, and the sinking table 212S is concave downward from a side of the connecting portion 212 facing the second plate 12, so as to avoid the first concave portion 123 along the height direction H. Thereby, when the reinforcing beam 2 is fixed to the first protrusion 111P on the first plate 11, the sinking table 212S can prevent the reinforcing beam 2 from squeezing the first concave portion 123 along the height direction H. However, if the first concave portion 123 and the first protrusion 111P are designed to be in a same horizontal plane, the sinking table 212S on the first plate body 21 of the reinforcing beam 2 may be adaptively canceled. Therefore, whether the sinking table 212S is set or not and downward concave distance of the sinking table 212S may be adaptively adjusted according to design of the first concave portion 123 used to form the heat exchange flow passage F. The reinforcing beam 2 is provided at a position of the opening 122 of the second plate 12, which may increase the strength at the opening 122 and prevent damage of the lower box body 1 at the opening 122 (a position where strength is weak). The first plate body 21 is formed by an integral impact.

Each second plate body 22 includes: a top wall 221, which is provided with a through hole 221h running through along the height direction H; two side walls 222, which are connected to both sides in the longitudinal direction L of the top wall 221 and extend to the first plate body 21; two connecting walls 223, which are connected to a corresponding side wall 222 and bend outward along the longitudinal direction L, respectively, and each connecting wall 223 is attached and fixed to a corresponding connecting portion 212 of the first plate body 21. The top wall 221 and the two side walls 222 of the second plate body 22 form a second concave groove 224 that is concave upward, and the second concave groove 224 and the first concave groove 213 form a storage cavity 23 together along the height direction H. Each second plate body 22 also includes: two lugs 225, each lug 225 is connected to an inner side in the transverse direction T corresponding to the side wall 222 and bends outward along a plane intersecting with the transverse direction T, and each lug 225 is close to the peripheral wall 112 of the first plate 11 and is located on a lower side of the flange 113 in the high direction H. The second plate body 22 is provided with a through hole 221h running through along the height direction H, which provides a hoisting point for the battery box in a hoisting process, and the second concave groove 224 and the first concave groove 213 form a holding cavity 23 together along the height direction H, which can provide hoisting space for a hoisting tool (such as a hoisting hook). Each lug 225 is bonded or welded to the peripheral wall 112 of the first plate 11, which plays a positioning role and prevents the battery box from moving along the transverse direction T during a hoisting or transporting process. In addition, during the hoisting process of the battery box, the reinforcing beam 2 bears weight of the whole battery box, and the lug 225 of the reinforcing beam 2 can transfer part of force to the lower box body, reducing deformation of the reinforcing beam 2 and improving the strength of the reinforcing beam 2. The second plate body 22 may be formed by impact bending molding.

The reinforcing beam 2 is provided to be multiple, and each reinforcing beam 2 is fixed on a corresponding first protrusion 111P passing through the opening 122 of the first plate 11. A plurality of reinforcing beams 2 are set at a corresponding opening 122, respectively, which can enhance strength of weak position of the lower box body, and then improve overall strength of the battery box; at the same time, the plurality of reinforcing beams 2 can ensure balance of the battery box in the hoisting process.

As shown in FIG. 2, the carling 4 extends along the longitudinal direction L and is provided at a central position of the bottom wall 111 along the transverse direction. The transom 3 extends along the transverse direction T, and a lower end in the height direction H of the transom 3 is fixed on the bottom wall 111 of the first plate 11. The transom 3 and the carling 4 are arranged crosswise in the accommodating space 114, which may adopt a plurality of arrangement forms. One case therein is that both ends in the transverse direction T of the transom 3 are connected to the peripheral wall 112 of the first plate 11, a central position in the transverse direction T of the transom 3 is provided with a notch running through along the longitudinal direction L, and the carling 4 extends along an entire longitudinal direction of the accommodating space 114 and passes through the notch of the transom 3, thus realizing cross arrangement of the transom 3 and the carling 4. The other case is that the carling 4 is an integration extending along entire longitudinal direction L of the accommodating space 114, and the transoms 3 on both sides in the transverse direction T of the carling 4 are two, and the two transoms 3 are aligned with each other on both sides of the carling 4 and are abuts against the carling 4. Or another case is that the transom 3 is an integration extending along the entire longitudinal direction L of the accommodating space 114, and the carling 4 is divided into a plurality of sections in the longitudinal direction L, and each section is clamped between two transoms 3 which are adjacent. The above-mentioned various cross arrangement situation can increase overall strength of the lower box body 1; in addition, a setting of the carling 4 provides an installation point for the reinforcing beam 2, so that the reinforcing beam 2 can be fixed on the carling 4, thus strength in the transverse direction T and the longitudinal direction L of the lower box body 1 is increased, thereby greatly increasing the overall strength of the lower box body 1. The reinforcing beam 2 is connected to the carling 4, and the carling 4 is connected to the transom 3. The reinforcing beam 2 can disperse force to carling 4 and then to the transom 3, thus relieving force borne by the reinforcing beam 2 during the hoisting process of the battery box, avoiding the damage or deformation of the reinforcing beam 2 due to bearing large force alone, and improving the strength of the reinforcing beam 2. The transom 3 and the carling 4 are arranged in a cross manner to divide the accommodating space 114 into a plurality of subspaces, and the plurality of battery packs 6 are accommodated in corresponding subspaces.

The fastener 5 passes through the connecting portion 212 of the reinforcing beam 2 and the first protrusion 111P of the first plate 11 and is fixed on the carling 4. Preferably, the fastener 5 is a bolt. The fastener 5 is used for fixed connection, so that the reinforcing beam 2 is detachably fixed to the lower box body 1, which is convenient for maintenance and replacement of the reinforcing beam 2.

The above-mentioned detailed description describes a plurality of illustrative embodiments, but it is not intended to be limited to explicitly disclosed combination herein. Therefore, unless there is other description, various features disclosed herein may be combined together to form a plurality of additional combinations not shown for simplicity purpose.

The invention claimed is:
1. A battery box, comprising:
a lower box body, wherein the lower box body comprises:
a first plate, comprising: a bottom wall; a peripheral wall, which is connected to a periphery of the bottom wall and extends upward; and the bottom wall and the peripheral wall form an accommodating space opening upwards;

a second plate, which is fixed to the bottom wall from a bottom and engages with the bottom wall to form a flow passage, wherein the second plate is provided with: at least one protrusion, which protrudes from a side facing at least one reinforcing beam to the first plate and extends along a transverse direction; and at least one opening, which runs through the at least one protrusion of the second plate along a height direction and extends along the transverse direction, the at least one protrusion of the second plate being connected to the bottom wall of the first plate in a sealed manner; and the battery box also comprises: the at least one reinforcing beam, which is arranged under the second plate and extends along the transverse direction, the at least one reinforcing beam being installed at a position corresponding to the at least one opening and being fixedly connected to the first plate and/or the second plate.

2. The battery box according to claim 1, wherein the bottom wall of the first plate is provided with at least one protrusion which is concave downward from a side of the bottom wall facing away from the second plate and protrudes to the second plate, and the at least one protrusion of the first plate passing through the at least one opening to fix the at least one reinforcing beam on the at least one protrusion of the first plate passing through the at least one opening.

3. The battery box according to claim 2, wherein the at least one reinforcing beam comprises a first plate body, and the first plate body comprises:

a bottom, which extends along the transverse direction; and two connecting portions, which are integrally connected to both sides in the longitudinal direction of the bottom, wherein each connecting portion extends upward along the height direction and extends outward along the longitudinal direction from a corresponding side of the bottom, and the two connecting portions are close to and fixed on the at least one protrusion of the first plate.

4. The battery box according to claim 3, wherein the second plate is provided with a first concave portion for forming a flow passage, and the first concave portion is concave downward from a side of the second plate facing the first plate and protrudes to the other side, the first concave portion protruding beyond the at least one protrusion of the first plate; and each connecting portion of the first plate body is provided with a sinking table at a position corresponding to the first concave portion of the second plate, and the sinking table is concave downward from a side of the connecting portion facing the second plate.

5. The battery box according to claim 3, wherein the at least one reinforcing beam also comprises: two second plate bodies, which are fixed at both ends in the transverse direction of the first plate and are located outside of the first plate and the second plate along the transverse direction; and each second plate body comprises: a top wall, which is provided with a through hole passing through along the height direction; two side walls, which are connected to both sides in the longitudinal direction of the top wall and extend to the first plate body; two connecting walls, which are connected to a corresponding side wall and bend outward along the longitudinal direction, respectively, each connecting wall being attached and fixed to a corresponding connecting portion of the first plate body.

6. The battery box according to claim 5, wherein the bottom of the first plate body and the two connecting portions form a first concave groove concaved downward; and the top wall and the two side walls of each second plate body form a second concave groove concaved upward, and the second concave groove and the first concave groove form a storage cavity together along the height direction.

7. The battery box according to claim 5, wherein each second plate body also includes two lugs, each lug is connected to an inner side of a corresponding side wall in the transverse direction and bends outward along a plane intersecting with the transverse direction, and each lug is close to the peripheral wall of the first plate.

8. The battery box according to claim 2, wherein the at least one reinforcing beam is provided to be multiple reinforcing beams, and each reinforcing beam is fixed on a corresponding protrusion of the first plate passing through the at least one opening of the first plate.

9. The battery box according to claim 3, wherein the battery box also comprises:

a carling which extends along the longitudinal direction; and at least one fastener which passes through a corresponding connecting portion of the at least one reinforcing beam and the at least one protrusion of the first plate and is fixed on the carling.

10. The battery box according to claim 1, wherein, the accommodating space is configured to accommodate a plurality of battery packs.

* * * * *